(12) United States Patent
Mariyani et al.

(10) Patent No.: US 11,785,445 B1
(45) Date of Patent: Oct. 10, 2023

(54) WIRELESS COMMUNICATION SERVICE OVER A NETWORK EXPOSURE FUNCTION AND MULTIPLE UNIFIED DATA ELEMENTS

(71) Applicant: T-Mobile Innovations LLC, Overland Park, KS (US)

(72) Inventors: Anil Kumar Mariyani, Ashburn, VA (US); Rajil Malhotra, Olathe, KS (US); Anuj Sharma, Broadlands, VA (US); Deepesh Belwal, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 293 days.

(21) Appl. No.: 17/358,943

(22) Filed: Jun. 25, 2021

(51) Int. Cl.
 *H04W 8/24* (2009.01)
 *G06F 9/54* (2006.01)
 *G06F 16/2455* (2019.01)
 *H04W 88/02* (2009.01)

(52) U.S. Cl.
 CPC ............ *H04W 8/24* (2013.01); *G06F 9/547* (2013.01); *G06F 16/2455* (2019.01); *H04W 88/02* (2013.01)

(58) Field of Classification Search
 CPC ..... H04W 88/02; H04W 8/24; G06F 16/2455; G06F 9/547
 See application file for complete search history.

(56) References Cited

U.S. PATENT DOCUMENTS

| | | | |
|---|---|---|---|
| 10,609,154 B2 | 3/2020 | Talebi Fard et al. | |
| 10,952,176 B2 | 3/2021 | Bharatia | |
| 10,999,787 B2 | 5/2021 | Dao et al. | |
| 2019/0053010 A1 | 2/2019 | Edge et al. | |
| 2019/0158408 A1 | 5/2019 | Li et al. | |
| 2022/0345379 A1* | 10/2022 | Li | H04L 41/5058 |

* cited by examiner

*Primary Examiner* — Elton Williams

(57) ABSTRACT

A wireless communication network serves a User Equipment (UE) with a Network Exposure Function (NEF) and multiple Unified Data Elements (UDEs) like Unified Data Managements (UDMs) and Unified Data Repositories (UDRs) The NEF receives initial network data and transfers a UDE query to a Network Repository Function (NRF). The NRF selects a Unified Data Proxy (UDP) and indicates the UDP to the NEF. The NEF receives the UDP indication and responsively transfers the initial network data to the UDP. The UDP receives the initial network data, and in response, selects one of the UDEs. The UDP transfers the initial network data to the selected one of the UDEs. The selected one of the UDEs receives the initial network data, and in response, generates and transfers new network data. In some examples, the UDEs comprise UDMs/UDRs that reside in different Public Land Mobile Networks (PLMNs) from one another and from the NEF.

20 Claims, 9 Drawing Sheets

WIRELESS COMMUNICATION SERVICE OVER A NETWORK EXPOSURE FUNCTION AND MULTIPLE UNIFIED DATA ELEMENTS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), Network Exposure Functions (NEFs), Application Functions (AFs), Unified Data Managements (UDMs), and Unified Data Repositories (UDRs), and the like.

The NEFs communicate with the other network elements to expose events and implement network capabilities. The NEFs and the AFs have an Application Programming Interface (API) framework to control the exposure of the events and the implementation of the network capabilities. The AFs are linked to external Application Servers (AS) that subscribe to the exposed events and services capabilities. The AS is often operated by a large operator that uses the AF and NEF to control services for a multitude of their affiliated wireless user devices. The NEF API calls from the AF allow the external AS to perform UE monitoring, device triggering background data transfer, parameter provisioning, packet flow description management, traffic influence, chargeable party control, and NEF session quality.

The UDRs store data for the network elements. The UDMs perform data tasks and often form the interface between the interface network elements and the UDRs. To interact, the NEFs, UDMs, and UDRs should be in the same Public Land Mobile Network (PLMN). The number of PLMNs is proliferating. Unfortunately, the interactions between the NEFs and the UDMs/UDRs across PLMN boundaries is problematic. Moreover, the increase in the number of NEFs to serve the increase in the amount of the PLMNs causes undue network complexity and heightened security risk.

TECHNICAL OVERVIEW

A wireless communication network serves a User Equipment (UE) with a Network Exposure Function (NEF) and multiple Unified Data Elements (UDEs) like Unified Data Managements (UDMs) and Unified Data Repositories (UDRs). The NEF receives initial network data and transfers a UDE query to a Network Repository Function (NRF). The NRF selects a Unified Data Proxy (UDP) and indicates the UDP to the NEF. The NEF receives the UDP indication and responsively transfers the initial network data to the UDP. The UDP receives the initial network data, and in response, selects one of the UDEs. The UDP transfers the initial network data to the selected one of the UDEs. The selected one of the UDEs receives the initial network data, and in response, generates and transfers new network data. In some examples, the UDEs comprise UDMs/UDRs that reside in different Public Land Mobile Networks (PLMNs) from one another and from the NEF.

DETAILED DESCRIPTION

Figure 1:
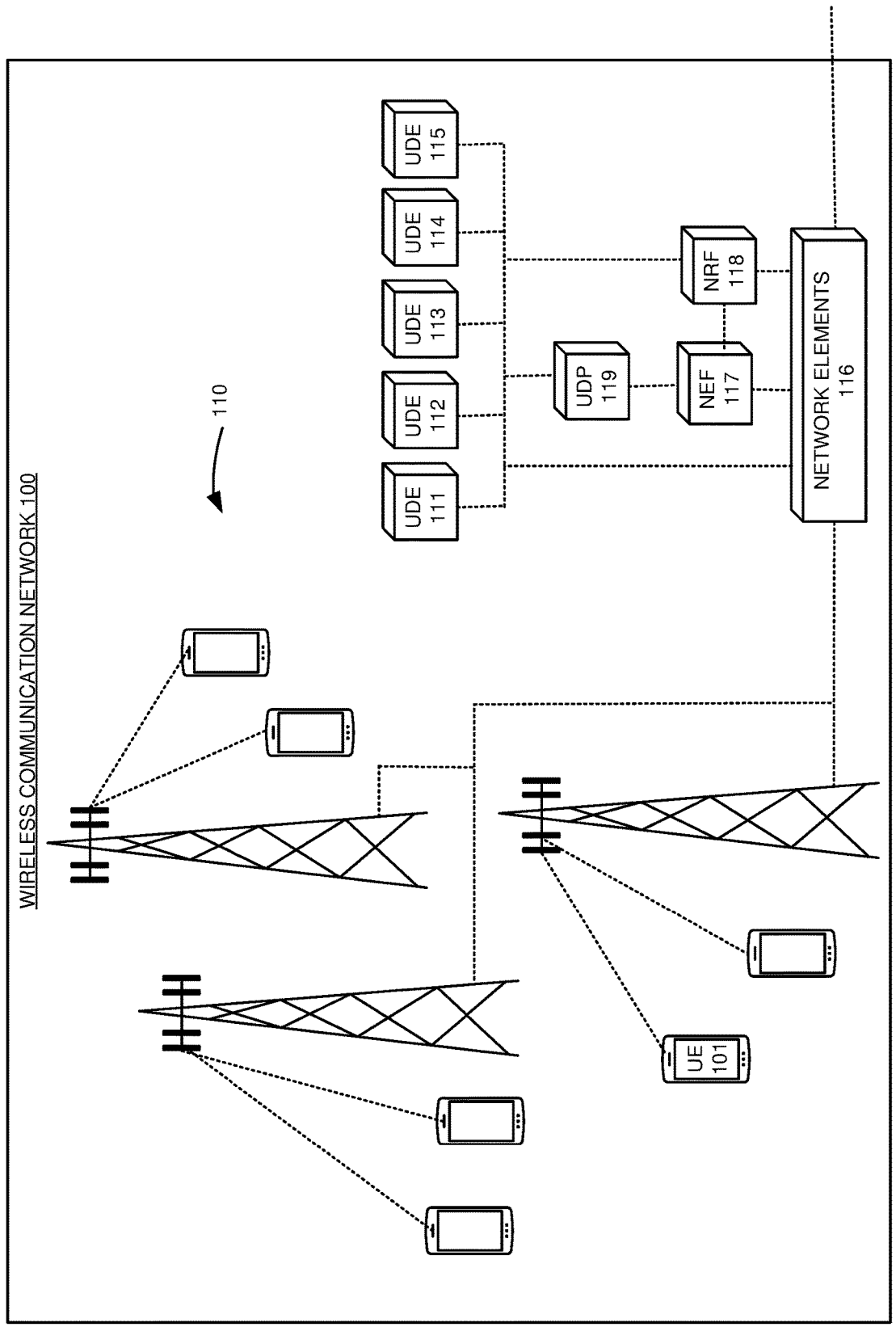
FIG. 1 illustrates a wireless communication network that serves User Equipment (UE) with a Network Exposure Function (NEF) and multiple Unified Data Elements (UDEs).

FIG. 1 illustrates wireless communication network 100 that serves User Equipment (UE) 101 with Network Exposure Function (NEF) 117 and Unified Data Elements (UDEs) 111-115. In some examples, UDEs 111-115 comprise Unified Data Managements (UDMs) and Unified Data Repositories (UDRs) that are in different PLMNs, so NEF 117 has access to the UDMs and the UDRs across different PLMNs. Wireless communication network 100 also comprises Radio Access Network (RAN) 110, network elements 116, Network Repository Function (NRF) 118, and Unified Data Proxy (UDP) 119. UE 101 comprises a computer, phone, vehicle, sensor, robot, or some other data appliance with data communication circuitry. Network elements 116 comprise Access and Mobility Management Function (AMF), Session Management Function (SMF), User Plane Function (UPF), Policy Control Function (PCF), Application Function (AF), and the like. Wireless communication network 100 is simplified and typically includes more UEs and RANs than shown.

Various examples of network operation and configuration are described herein. In some examples, NEF 117 receives network data like an identifier for UE 101—possibly from an AF. In response to the network data, NEF 117 transfers a UDE query to NRF 118. NRF 118 receives the UDE query, selects UDP 119, and identifies UDP 119 to NEF 117. NEF 117 responsively transfers the network data to UDP 119. UDP 119 receives the network data and selects one of UDEs 111-115—UDP 113 is selected in this example. UDP 119 transfers the network data to selected UDE 113. UDE 113 receives the network data and responsively generates new data. UDE 113 may comprise a UDM that translates a General Public Subscriber Identifier (GPSI) for UE 101 into a Subscriber Permanent Identifier (SUPI) for UE 101. UDE 113 may comprise a Unified Data Repository (UDR) that converts the SUPI and network instruction for UE 101 into a network address for UE 101 and network signaling that drives network elements 116 to serve UE 101. Advantageously, NEF 117 effectively interacts with UDEs 111-115 through UDP 119—even across PLMN boundaries. Moreover, the single NEF 117 simplifies network complexity and reduces the security risk of having several NEFs.

UE 101 communicates with RAN 110 over technologies like Fifth Generation New Radio (5GNR), Long Term Evolution (LTE), Institute of Electrical and Electronic Engineers (IEEE) 802.11 (WIFI), Bluetooth, or some other wireless communication protocol. The communication links in wireless communication network 100 use metallic wiring, glass fibers, radio channels, or some other communication media. The communication links use IEE 802.3 (Ethernet), Time Division Multiplex (TDM), Data Over Cable System Interface Specification (DOCSIS), WIFI, Internet Protocol (IP), General Packet Radio Service Transfer Protocol (GTP), virtual switching, inter-processor communication, bus interfaces, and/or some other data communication protocols. UE 101, RAN 110, UDEs 111-115, network elements 116, NEF 117, NRF 118, and UDP 119 comprise microprocessors, software, memories, transceivers, bus circuitry, and the like. UE 101 and RAN 110 also comprise radios. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
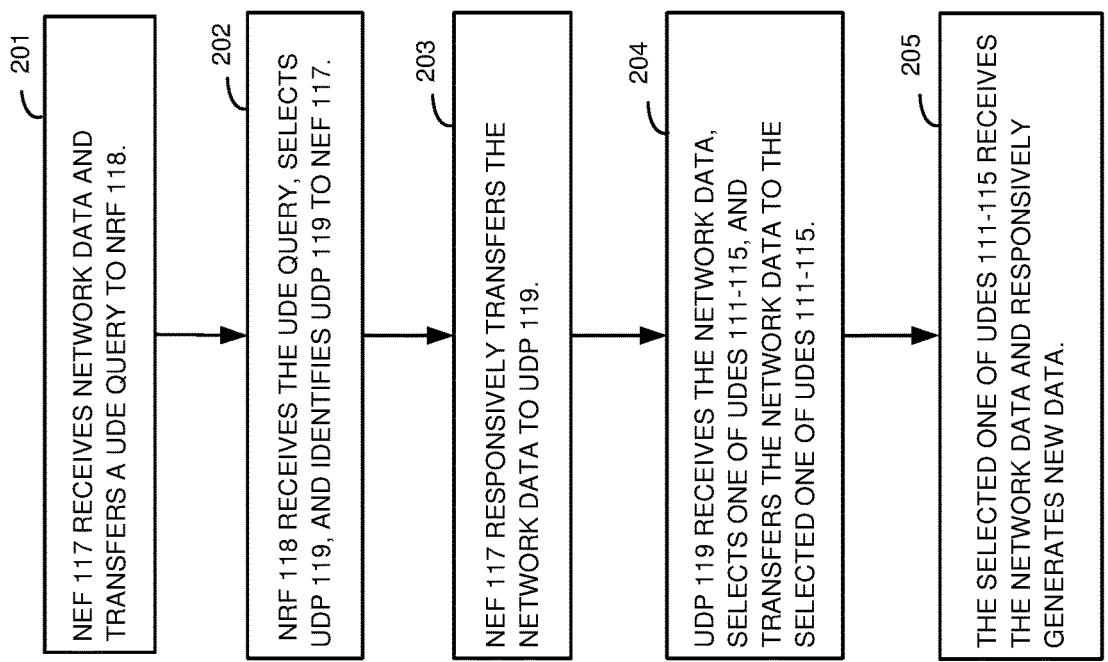
FIG. 2 illustrates an exemplary operation of the wireless communication network to serve the UE with the NEF and the multiple UDEs.

FIG. 2 illustrates an exemplary operation of wireless communication network 100 to serve UE 101 with NEF 117 and the UDEs 111-115. The operation may vary in other examples. NEF 117 receives network data and transfers a UDE query to NRF 118 (201). NRF 118 receives the UDE query, selects UDP 119, and identifies UDP 119 to NEF 117 (202). NEF 117 responsively transfers the network data to UDP 119 (203). UDP 119 receives the network data, selects one of UDEs 111-115, and transfers the network data to the selected one of UDEs 111-115 (204). The selected one of UDEs 111-115 receives the network data and responsively generates new data (205).

Figure 3:
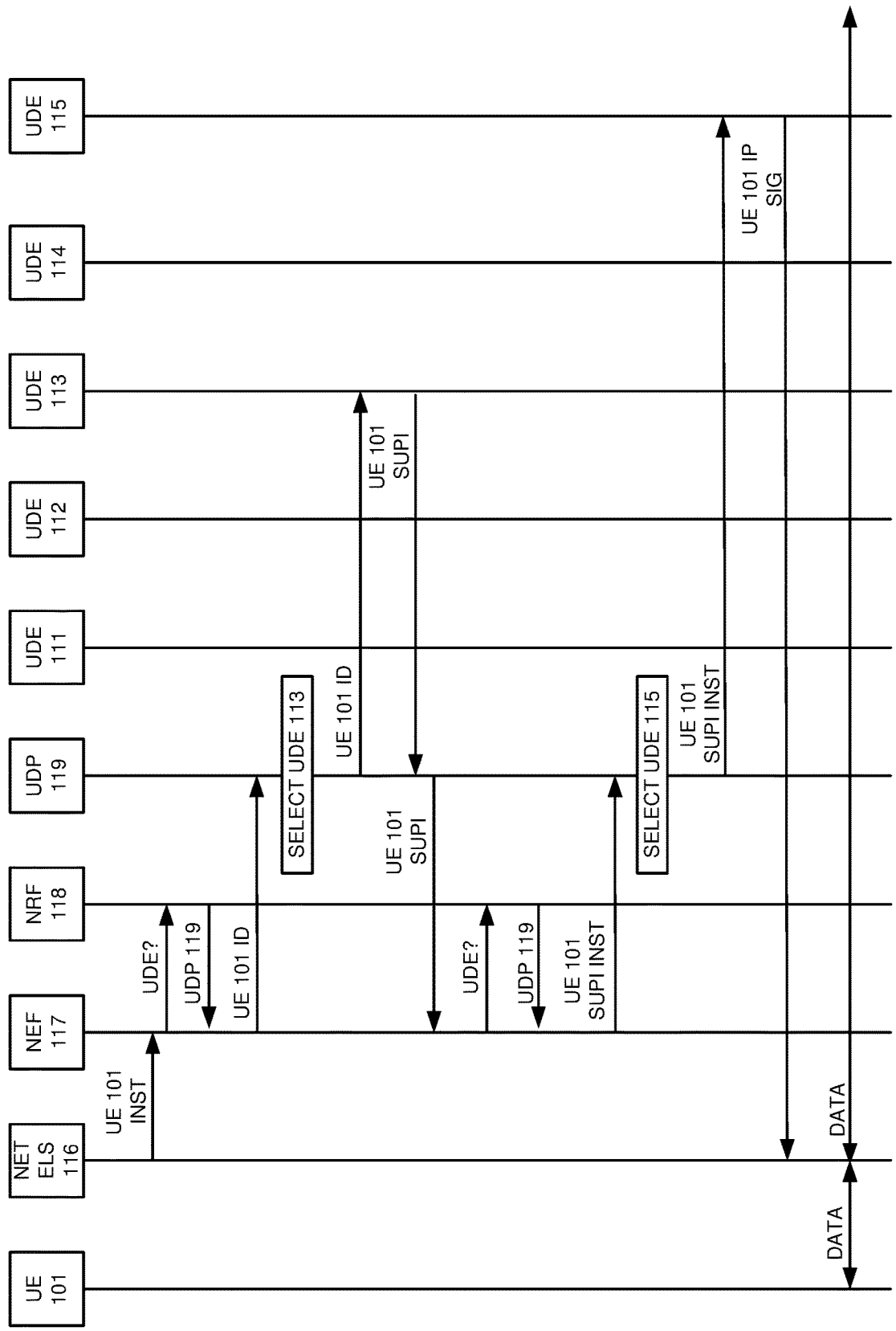
FIG. 3 illustrates an exemplary operation of the wireless communication network to serve the UE with the NEF and the multiple UDEs.

FIG. 3 illustrates an exemplary operation of the wireless communication network 100 to serve UE 101 with NEF 117 and UDEs 111-115. The operation may vary in other examples. An AF in network elements 116 transfers a UE Identity (ID) for UE 101 and a network instruction (INST) for UE 101 to NEF 117. NEF 117 receives UE 101 and network instruction for UE 101, and to translate the UE ID, NEF 117 transfers a UDE query to NRF 118. In response to the query, NRF 118 selects UDP 119 and indicates UDP 119 to NEF 117. The selection could be based on a data structure that correlates NEFs and UDPs. NEF 117 transfers the UE ID for UE 101 to UDP 119. UDP 119 selects UDE 113 to translate the UE ID and transfers the UE ID to selected UDE 113. UDE 113 translates the ID for UE 101 ID into a SUPI for UE 101. UDE 113 transfers the SUPI for UE 101 back to NEF 117 over UDP 119.

NEF 117 receives the SUPI for UE 101 and transfers another UDE query to NRF 118 to implement the instruction. In response to the other query, NRF 118 selects UDP 119 and indicates UDP 119 to NEF 117. NEF 117 transfers the SUPI and network instruction for UE 101 to UDP 119. UDP 119 now selects UDE 115 and transfers the SUPI and network instruction for UE 101 to UDE 115. The selection could be based a report from UDE 115 that it is currently serving UE 101. UDE 115 translates the SUPI for UE 101 into the IP address for UE 101. UE 115 and converts the network instruction for UE 101 into network signaling that drives network elements 116 to serve UE 101. UDE 115 transfers the IP address and network signaling (SIG) to network elements 116. UE 101 and external systems exchange user data over network elements 116 per the network signaling.

Figure 4:
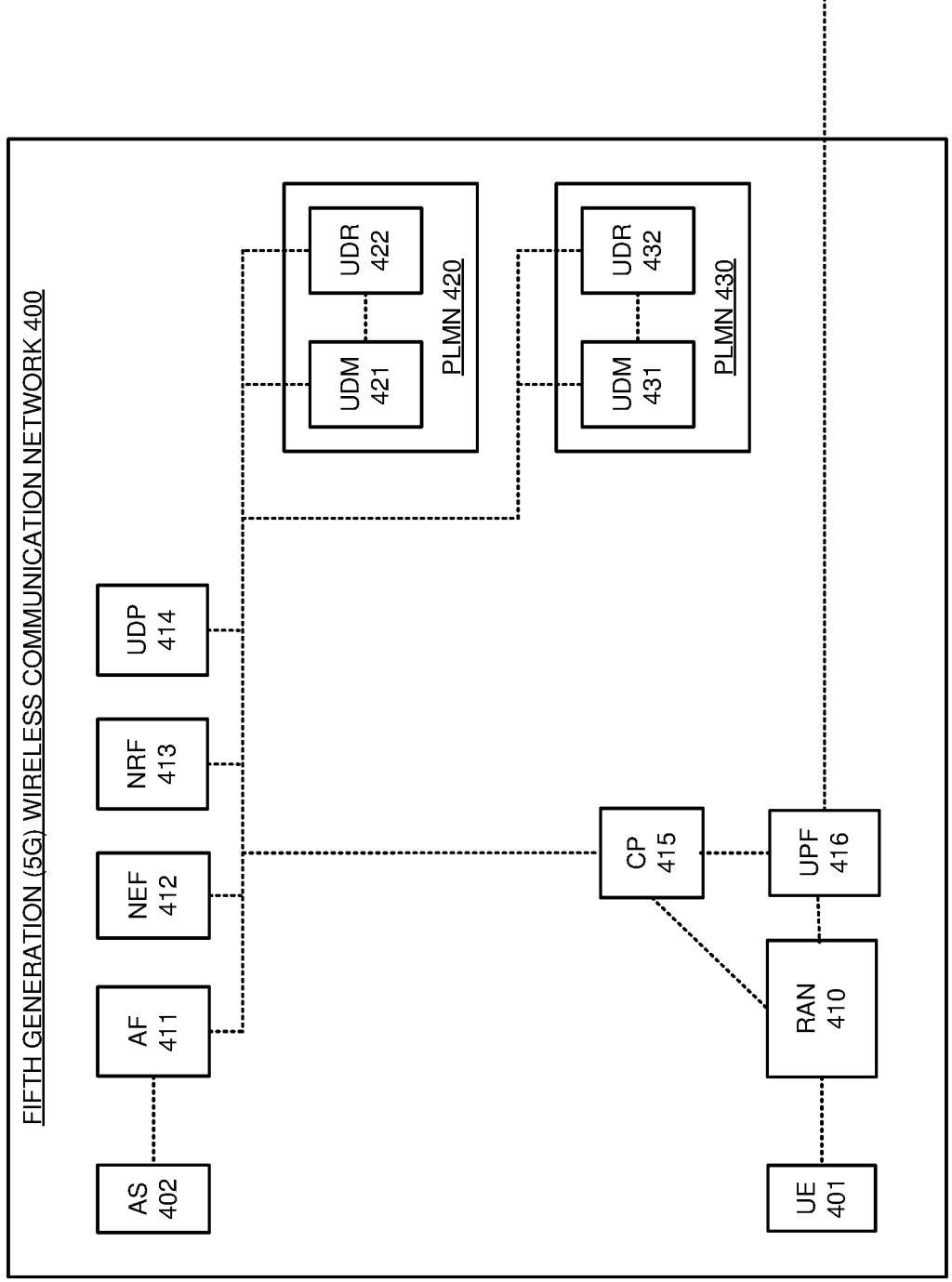
FIG. 4 illustrates a Fifth Generation (5G) wireless communication network to serve UEs with a NEF and multiple Unified Data Managements (UDMs) and Unified Data Repositories (UDRs).

FIG. 4 illustrates Fifth Generation (5G) wireless communication network 400 to serve UE 401 with Network Exposure Function (NEF) 412, Unified Data Management (UDM) 421, UDM 431, Unified Data Repository (UDR) 431, and UDR 432. 5G wireless communication network 400 comprises an example of wireless communication network 100, although network 100 may differ. 5G wireless communication network 400 comprises: UE 401, RAN 410, Application Function (AF) 411, NEF 412, Network Repository Function (NRF) 413, Unified Data Proxy (UDP) 414, Control Plane (CP) 415, User Plane Function (UPF) 416, Public Land Mobile Network (PLMN) 420, and PLMN 430. PLMN 420 comprises UDM 421 and UDR 422. PLMN 430 comprises UDM 431 and UDR 432. CP 415 comprises network functions like Access and Mobility Management Function (AMF), Session Management Function (SMF), Policy Control Function (PCF), Network Slice Selection Function (NSSF), and the like.

Application Server (AS) 402 transfers a traffic influence instruction for UE 401 to AF 411. The traffic influence instruction identifies UE 401 by its Generic Public Subscriber Identifier (GPSI), Group Identifier (GI), Network Access Identifier (NAI), Subscriber Concealed Identifier (SUCI), or some other UE indicator. AF 411 transfers the traffic influence instruction for UE 401 to NEF 412 over a northbound Application Programming Interface (API). In response to the traffic influence instruction, NEF 412 queries NRF 413 for a UDM to translate the UE ID into a Subscriber Permanent Identifier (SUPI). NRF 413 selects UDP 414 to handle the translation and indicates UDP 414 to NEF 412.

NEF 412 receives the indication of UDP 414 and forwards the UE ID for UE 401 to UDP 414. UDP 414 receives the UE ID for UE 401 and selects UDM 421 to translate the UE ID into a SUPI for UE 401. The selection is based on a data structure, broadcast/response, or hash algorithm that correlates UE 401 with PLMN 420 and UDM 421. UDP 414 transfers the UE ID for UE 401 to UDM 421 in PLMN 420. UDM 421 transfers the UE ID for UE 401 to UDR 422 which returns the SUPI for UE 401. UDM 421 transfers the SUPI for UE 401 to UDP 414. UDP 414 transfers the SUPI for UE 401 to NEF 412.

NEF 412 receives the SUPI for UE 401 and now queries NRF 413 for a UDR to implement the traffic influencing instruction for the SUPI. NRF 413 selects UDP 414 to handle the traffic influencing instruction for UE 401 and indicates UDP 414 to NEF 412. NEF 412 transfers the SUPI and traffic influencing instruction for UE 401 to UDP 414.

UDP 414 receives the SUPI and traffic influencing instruction for UE 401. UDP 414 selects UDR 432 to implement the traffic influencing instruction for UE 401. The selection is based on data from UDR 432 which indicates that UDR 432 in PLMN 420 is currently serving UE 401. For example, UE 401 may attach to PLMN 430, and UDR 432 would store the IP address and SUPI for UE 401 in UE context. UDR 432 would signal or respond to UDP 414 to indicate this relationship between UDR 432 and UE 401. UDP 414 transfers the SUPI and traffic influencing instruction for UE 401 to UDR 432 in PLMN 430.

UDR 432 receives the SUPI and traffic influencing instruction for UE 401. UDR 432 translates the SUPI for UE 401 into the IP address for UE 401. UDR 432 converts the traffic influencing instruction for UE 401 into network signaling that drives network 400 to influence the traffic that uses the IP address for UE 401. UDR 432 transfers the network signaling to CP 415. CP 415 receives the network signaling and transfers corresponding network signaling to UE 401, RAN 410, and UPF 416. In response, UE 401 exchanges user data with an external data system over RAN 410 and UPF 416.

UPF 416 influences the traffic that UE 401 exchanges over RAN 410 and UPF 416 per the corresponding network signaling. For example, UE 401 may receive an uplink data rate boost. UDP 414 efficiently and effectively links NEF 412 to the UDMs and UDRs across several different PLMNs. Thus, UDP 414 enables NEF 412 to interact with the UDMs and UDRs in several PLMNs. Advantageously, a single NEF may be used to serve multiple AFs to enhance ease-of-use, efficiency, and security.

Figure 5:
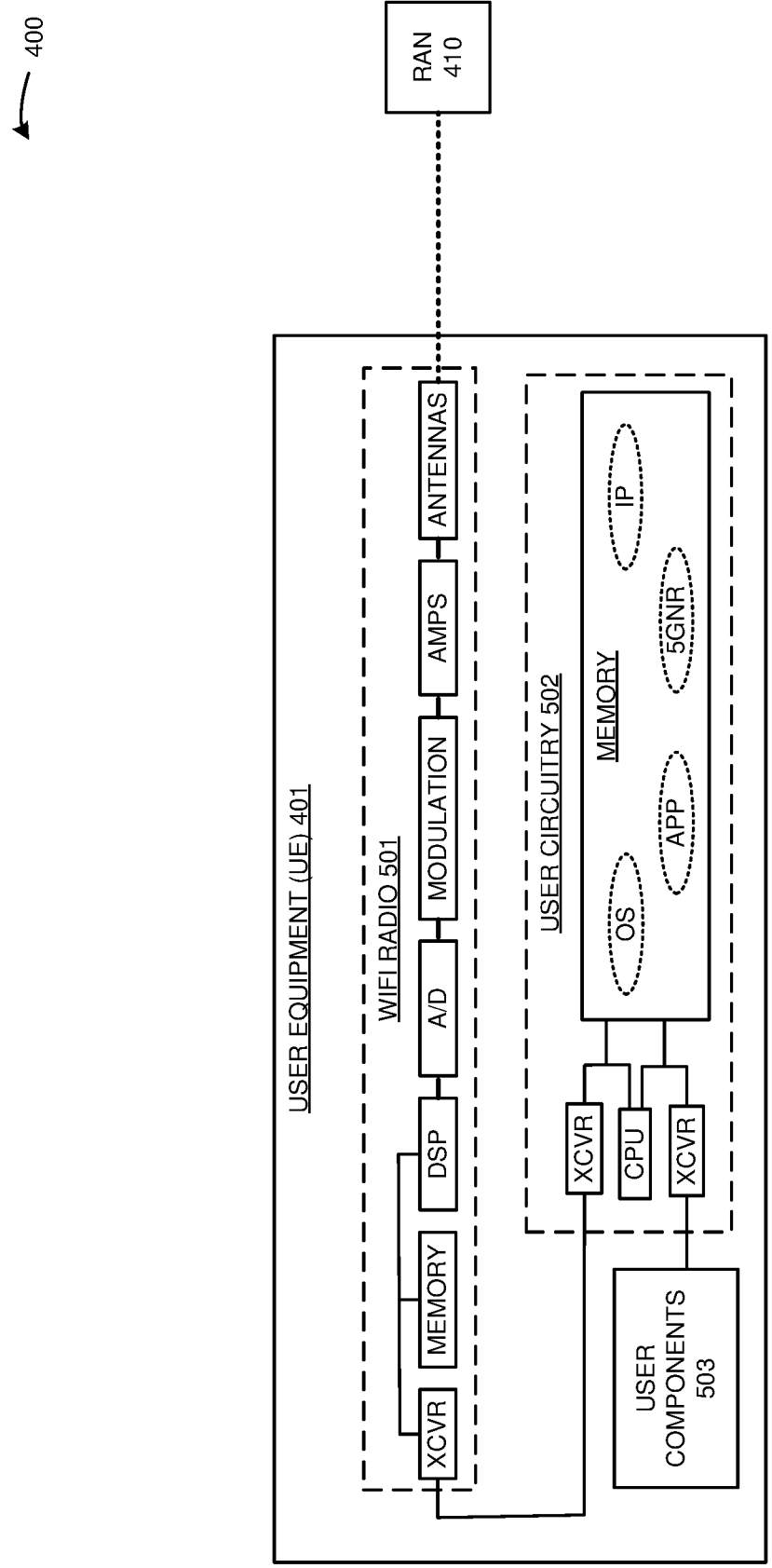
FIG. 5 illustrates a UE in the 5G wireless communication network.

FIG. 5 illustrates UE 401 in 5G wireless communication network 400. UE 401 comprises an example of UE 101, although UE 101 may differ. UE 401 comprises 5G New Radio (5GNR) radio 501, user circuitry 502, and user components 503. User components 503 comprise sensors, controllers, displays, or some other user apparatus that consumes wireless data service. 5GNR radio 501 comprises antennas, amplifiers, filters, modulation, analog-to-digital interfaces, DSP, memory, and transceivers that are coupled over bus circuitry. User circuitry 502 comprises memory, CPU, user interfaces and components, and transceivers that are coupled over bus circuitry. The memory in user circuitry 502 stores an operating system, user applications (APP), and network applications for 5GNR and IP. The 5GNR network applications comprise components like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radio 501 are wirelessly coupled to RAN 410 over a 5GNR link. Transceivers (XCVRs) in 5GNR radio 501 are coupled to transceivers in user circuitry 502. Transceivers in user circuitry 502 are coupled to user components 503. The CPU in user circuitry 502 executes the operating system, user applications, and network applications to exchange network signaling and user data with RAN 410.

Figure 6:
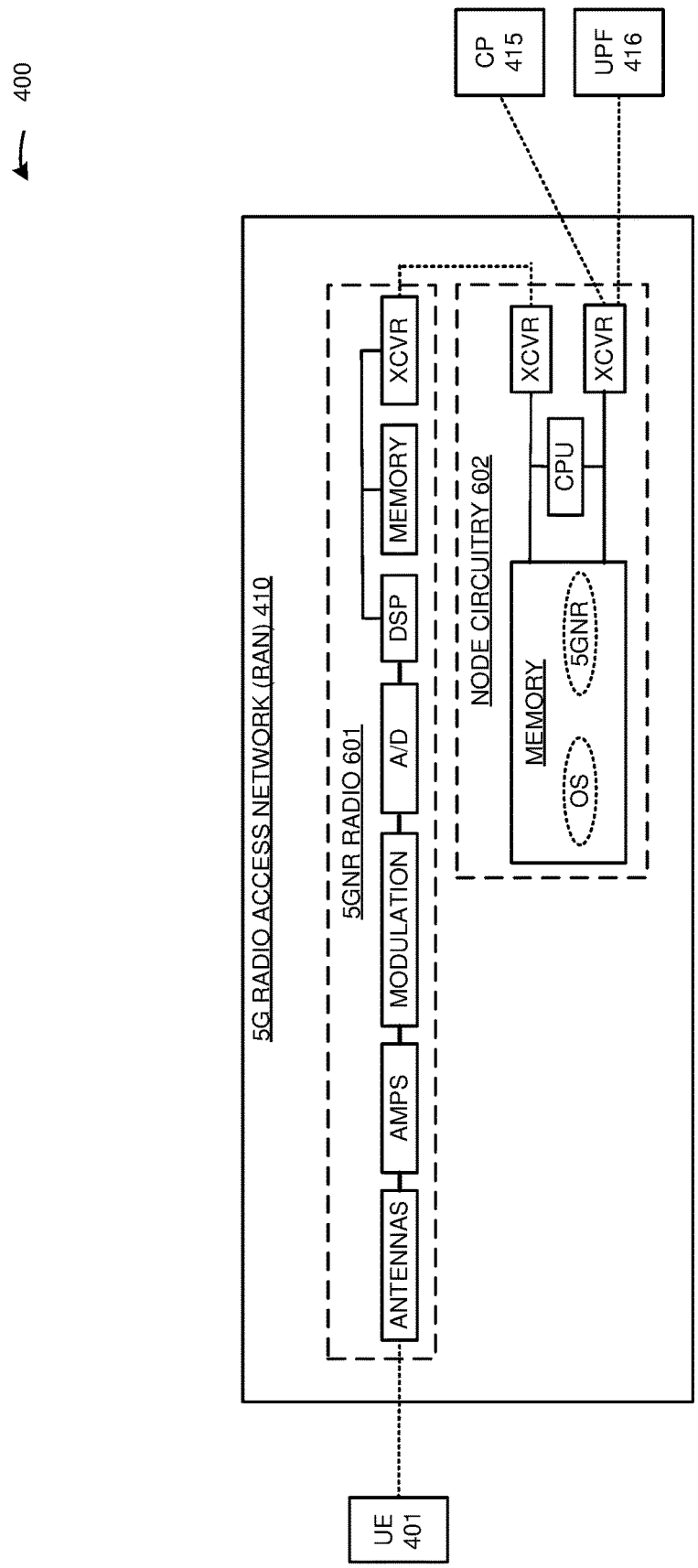
FIG. 6 illustrates a 5G Radio Access Network (RAN) in the 5G wireless communication network.

FIG. 6 illustrates 5G RAN 410 in 5G wireless communication network 400. 5G RAN 410 comprises an example of RAN 110, although RAN 110 may differ. 5G RAN 410 comprises 5GNR radio 601 and node circuitry 602. 5GNR radio 601 comprises antennas, amplifiers, filters, modulation, analog-to-digital interfaces, DSP, memory, and transceivers that are coupled over bus circuitry. Node circuitry 602 comprises memory, CPU, user interfaces and components, and transceivers that are coupled over bus circuitry. The memory in node circuitry 602 stores an operating system and network applications for IP and 5GNR. The 5GNR network applications comprise components like PHY, MAC, RLC, PDCP, SDAP, and RRC. The antennas in 5GNR radio 601 are wirelessly coupled to UE 401 over a 5GNR link. Transceivers in 5GNR radio 601 are coupled to transceivers in node circuitry 602. Transceivers in node circuitry 602 are coupled to CP 415 and UPF 416. The CPU in node circuitry 602 executes the operating systems and network applications to exchange network signaling with UE 401 and CP 415. The CPU in node circuitry 602 executes the operating systems and network applications to exchange user data with UE 401 and UPF 416.

Figure 7:
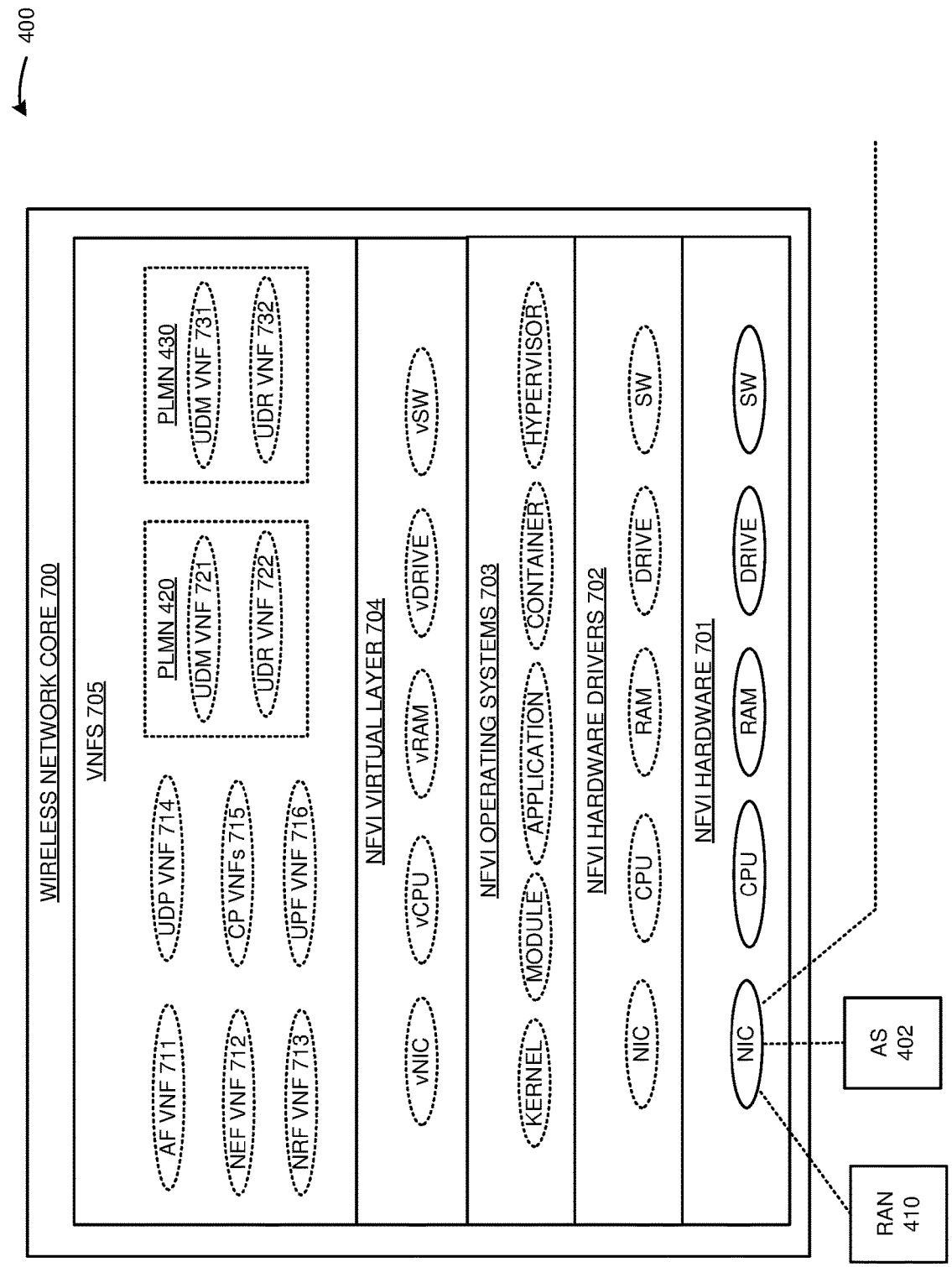
FIG. 7 illustrates a wireless network core in the 5G wireless communication network.

FIG. 7 illustrates wireless network core 700 in the 5G wireless communication network 400. Wireless network core 700 comprises an example of UDEs 111-115, network elements 116, NEF 117, NRF 118, and UDP 119 in wireless communication network 100, although those network components may differ. Wireless network core 700 comprises Network Function Virtualization Infrastructure (NFVI) hardware 701, NFVI hardware drivers 702, NFVI operating systems 703, NFVI virtual layer 704, and Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. VNFs 705 comprise AF VNF 711, NEF VNF 712, NRF VNF 713, UDP VNF 714, CP VNFs 715, UPF VNF 716, UDM VNF 721 in PLMN 420, UDR VNF 722 in PLMN 420, UDM VNF 731 in PLMN 430, and UDR VNF 732 in PLMN 430. CP VNFs 715 comprise AMF VNFs, SMF VNFs, PCF VNFs, NSSI VNFs, and the like. Wireless network core 700 may be located at a single site or be distributed across multiple geographic locations. The NIC transceivers in NFVI hardware 701 are coupled to 5G RAN 410, AS 402, and external data systems. NFVI hardware 701 executes NFVI hardware drivers 702, NFVI operating systems 703, NFVI virtual layer 704, and VNFs 705 to form and operate AF 411, NEF 412, NRF 413, UDP 414, CPs 415, UPF 416, UDM 421, UDR 422, UDM 431, and UDR 432.

Figure 8:
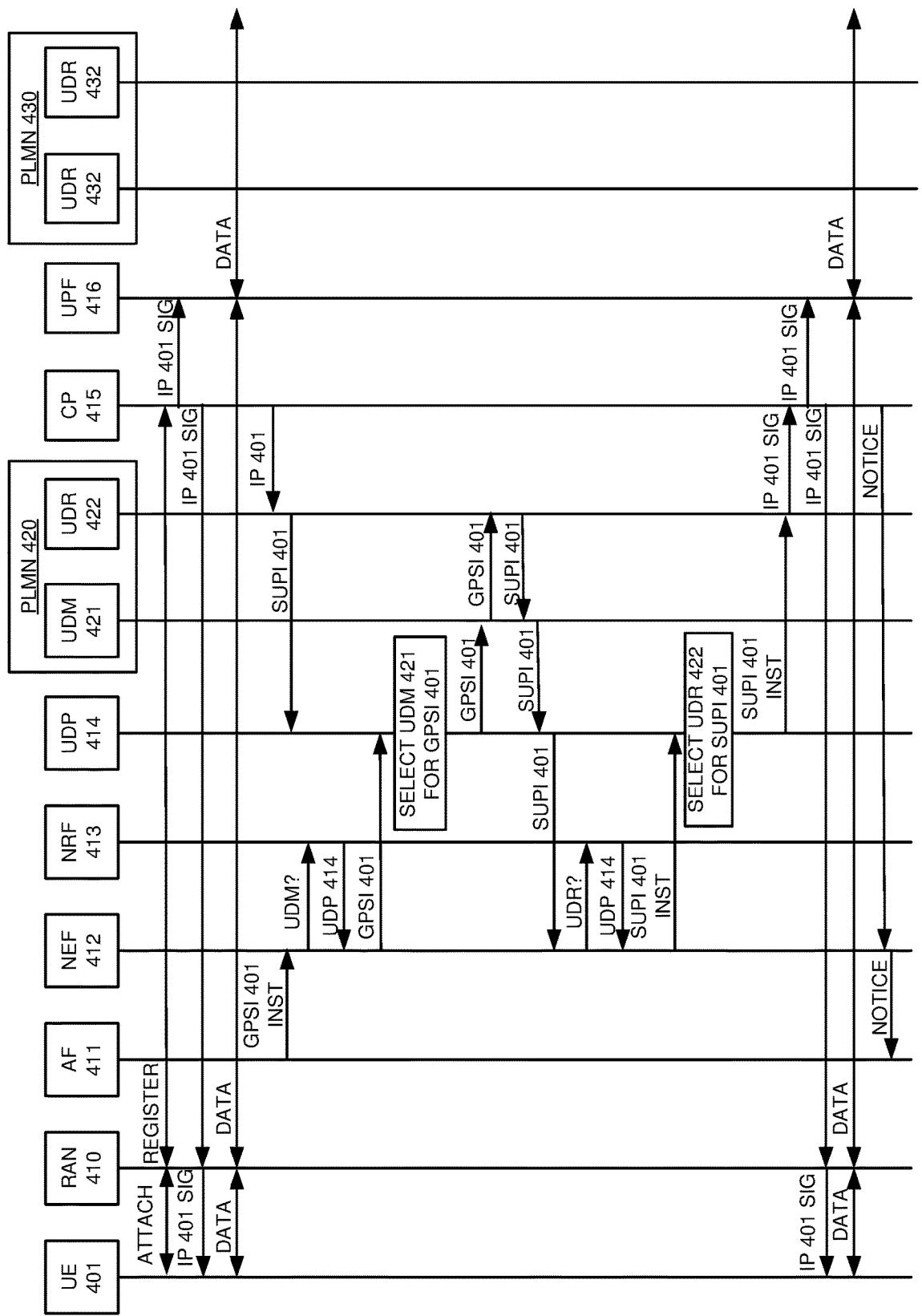
FIG. 8 illustrates an exemplary operation of the 5G wireless communication network to serve the UEs with the NEF and the multiple UDMs and UDRs.

FIG. 8 illustrates an exemplary operation of 5G wireless communication network 400 to serve UE 401 with NEF 412, UDM 421, and UDR 422. The operation may differ in other examples. UE 401 wirelessly attaches to RAN 410 and registers with CP 415 to use PLMN 420. CP 415 transfers signaling (SIG) to UE 401, RAN 410, and UPF 416. The signaling indicates the IP address for UE 401 (IP 401) and controls data rate, latency, and the like. In response, UE 401 and RAN 410 exchange user data per the signaling. RAN 410 and UPF 416 exchange the user data per the signaling. UPF 416 and external data systems exchange the user data per the signaling. CP 415 notifies UDR 422 in serving PLMN 420 of IP 401 and other context for UE 401. UDR 422 in serving PLMN 420 notifies UDP 414 that it is serving UE 401 by indicating the SUPI for UE 401 (SUPI 401) to UDP 414.

AF 411 transfers a traffic influence instruction for UE 401 to NEF 412. The traffic influence instruction identifies UE 401 with a Generic Public Subscriber Identifier (GPSI) for UE 401 (GPSI 401). AF 411 may receive the traffic influence instruction for UE 401 from an external AS. AF 411 transfers the traffic influence instruction for GPSI 401 to NEF 412 over a northbound API. In response to the traffic influence instruction, NEF 412 queries NRF 413 for a UDM to translate GPSI 401. NRF 413 selects UDP 414 to handle the traffic influencing instruction for UE 401 and indicates UDP 414 to NEF 412.

NEF 412 receives the indication for UDP 414 and forwards GPSI 401 to UDP 414. UDP 414 receives GPSI 401 and selects UDM 421 to translate GPSI 421. The selection is based on a data structure, broadcast/response, or hash algorithm that correlates UE 401 with the UDM/UDR that has the UE 401/SUPI 401 translation. UDP 414 transfers GPSI 401 to UDM 421. UDM 421 transfers GPSI 401 to UDR 422 which returns SUPI 401. UDM 421 transfers SUPI 401 to UDP 414. UDP 414 transfers SUPI 401 to NEF 412. NEF 412 receives SUPI 401 and re-queries NRF 413 for a UDR to implement the traffic influencing instruction for SUPI 401. NRF 413 selects UDP 414 to handle the traffic influencing instruction and indicates UDP 414 to NEF 412. NEF 412 transfers the traffic influencing instruction for SUPI 401 to UDP 414. UDP 414 receives the traffic influencing instruction for SUPI 401 and selects UDR 422 to implement the traffic influencing instruction for SUPI 401. The selection is based on the indication that UDR 422 is serving SUPI 401. UDP 414 transfers the traffic influencing instruction for SUPI 401 to UDR 422 in PLMN 420.

UDR 422 receives the traffic influencing instruction for SUPI 401. UDR 422 translates SUPI 401 into IP 401. UDR 422 converts the traffic influencing instruction for SUPI 401 into network signaling to influence traffic that uses IP 401. UDR 422 transfers the network signaling for IP 401 to CP 415. CP 415 receives the network signaling and transfers corresponding network signaling for IP 401 to UE 401, RAN 410, and UPF 416. The corresponding signaling indicates IP 401 and controls data rate, latency, and the like. In response, UE 401 and RAN 410 exchange user data per the corresponding signaling. RAN 410 and UPF 416 exchange the user data per the corresponding signaling. UPF 416 and external data systems exchange the user data per the corresponding signaling. UE 401, RAN 410, and UPF 416 influence the data exchange per the corresponding signaling. For example, UE 401 may receive extremely low-latency for a time period.

CP 415 transfers a notice to NEF 412 to indicate the actual performance of the traffic influencing for SUPI 401. NEF 412 transfers a notice to AF 411 to indicate the actual performance of the traffic influencing for GPSI 401. AF 411 may transfer a notice to an external AS to indicate the actual performance of the traffic influencing for GPSI 401.

Figure 9:
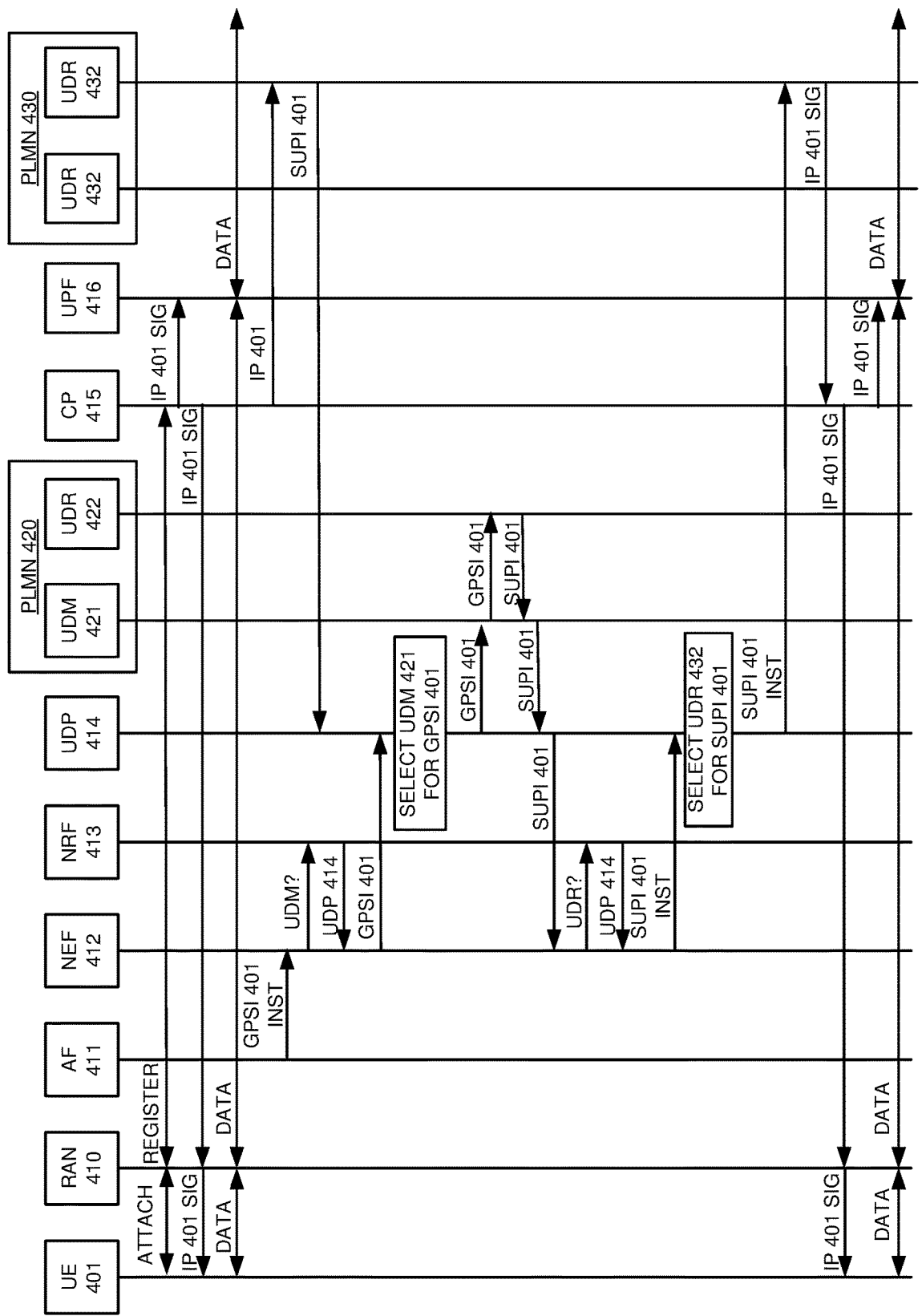
FIG. 9 illustrates an exemplary operation of the 5G wireless communication network to serve the UEs with the NEF and the multiple UDMs and UDRs.

FIG. 9 illustrates an exemplary operation of 5G wireless communication network 400 to serve UE 401 with NEF 412, UDM 421, UDR 422, UDM 431, and UDR 432. The operation may differ in other examples. UE 401 wirelessly attaches to RAN 410 and registers with CP 415 to use PLMN 430. CP 415 transfers signaling (SIG) for UE 401 to UE 401, RAN 410, and UPF 416. The signaling indicates an IP address for UE 401 (IP 401) and controls data rate, latency, and the like. In response, UE 401 and RAN 410 exchange user data per the signaling. RAN 410 and UPF 416 exchange the user data per the signaling. UPF 416 and external data systems exchange the user data per the signaling. CP 415 notifies UDR 432 in serving PLMN 430 of IP 401 and other context for UE 401. UDR 432 in serving PLMN 430 notifies UDP 414 that it is serving UE 401 by indicating the SUPI for UE 401 (SUPI 401).

AF 411 transfers a traffic influence instruction for UE 401 to NEF 412 over an N33 interface. The traffic influence instruction identifies UE 401 with a GPSI (GPSI 401). AF 411 may receive the traffic influence instruction for UE 401 from an external AS. AF 411 transfers the traffic influence instruction for GPSI 401 to NEF 412 using the northbound API. In response to the traffic influence instruction, NEF 412 queries NRF 413 for a UDM to translate GPSI 401. NRF 413 selects UDP 414 to handle the translation and indicates UDP 414 to NEF 412.

NEF 412 receives the indication of UDP 414 and forwards GPSI 401 to UDP 414. UDP 414 receives GPSI 401 and selects UDM 421 to translate GPSI 401. The selection is based on a data structure, broadcast/response, or hash algorithm that correlates UE 401 with the UDM that has the UE 401/SUPI 401 translation. UDP 414 transfers GPSI 401 to UDM 421. UDM 421 transfers GPSI 401 to UDR 422 which returns SUPI 401. UDM 421 transfers SUPI 401 to UDP 414. UDP 414 transfers SUPI 401 to NEF 412.

NEF 412 receives SUPI 401 and re-queries NRF 413 for a UDR to implement the traffic influencing instruction for SUPI 401. NRF 413 selects UDP 414 to handle the traffic influencing instruction and indicates UDP 414 to NEF 412. NEF 412 transfers the traffic influencing instruction for SUPI 401 to UDP 414. UDP 414 receives the traffic influencing instruction for SUPI 401 and selects UDR 432 to implement the traffic influencing instruction for SUPI 401. The selection is based on the indication that UDR 432 is serving SUPI 401. UDP 414 transfers the traffic influencing instruction for SUPI 401 to UDR 432 in serving PLMN 430. Note that UDM 421 and UDR 422 in PLMN 420 have the UE 401/SUPI 401 translation, but UDR 432 in different PLMN 430 is currently serving UE 401 and handles the traffic influencing.

UDR 432 receives the traffic influencing instruction for SUPI 401. UDR 432 translates SUPI 401 into IP 401. UDR 432 converts the traffic influencing instruction for SUPI 401 into network signaling to influence traffic for IP 401. UDR 432 transfers the network signaling for IP 401 to CP 415. CP 415 receives the network signaling and transfers corresponding network signaling for IP 401 to UE 401, RAN 410, and UPF 416. The corresponding signaling indicates IP 401 and controls data rate, latency, and the like. In response, UE 401 and RAN 410 exchange user data per the corresponding signaling. RAN 410 and UPF 416 exchange the user data per the corresponding signaling. UPF 416 and external data systems exchange the user data per the corresponding signaling. UE 401, RAN 410, and UPF 416 influence the data exchange per the corresponding signaling. For example, UE 401 may receive a downlink data rate boost.

Although not shown for clarity, CP 415 may transfer a notice to NEF 412 to indicate the actual performance of the traffic influencing for SUPI 401. NEF 412 may transfer a notice to AF 411 to indicate the actual performance of the traffic influencing for GPS1 401. AF 411 may transfer a notice to an external AS to indicate the actual performance of the traffic influencing for GPS1 401.

The wireless data network circuitry described above comprises computer hardware and software that form special-purpose networking circuitry to serve UEs to serve the UEs with a NEF and multiple UDMs and UDRs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs with a NEF and multiple UDMs and UDRs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a User Equipment (UE) with a Network Exposure Function (NEF) and multiple Unified Data Elements (UDEs), the method comprising:
   the NEF receiving initial network data and responsively transferring a UDE query to a Network Repository Function (NRF);
   the NRF receiving the UDE query, and in response, selecting a Unified Data Proxy (UDP) and indicating the UDP to the NEF;
   the NEF receiving the UDP indication and responsively transferring the initial network data to the UDP;
   the UDP receiving the initial network data, and in response, selecting one of the UDEs and transferring the initial network data to the selected one of the UDEs; and
   the selected one of the UDEs receiving the initial network data, and in response, generating and transferring new network data.

2. The method of claim 1 wherein
   the multiple UDEs comprise multiple Unified Data Managements (UDMs);
   the NEF receiving and transferring the initial network data comprises receiving a UE Identifier (UE ID) for the UE and transferring the UE ID for the UE to the UDP;
   the UDP receiving the initial network data, selecting the one of the UDEs, and transferring the initial network data to the selected one of the UDEs comprises receiving the UE ID, selecting one of the UDMs, and transferring the UE ID to the selected one of the UDMs;
   the selected one of the UDEs receiving the initial network data, generating the new network data, and transferring the new network data comprises the selected one of the UDMs receiving the UE ID for the UE, determining a Subscriber Permanent Identifier (SUPI) for the UE, and transferring the SUPI for the UE to the UDP; and further comprising
   the UDP receiving the SUPI for the UE and transferring the SUPI for the UE to the NEF; and
   the NEF receiving the SUPI for the UE and performing a network task for the UE with the SUPI.

3. The method of claim 2 wherein the UE ID comprises at least one of a Generic Public Subscriber Identifier, Group Identifier, Network Access Identifier (NAI), Internet Protocol (IP) address, and Subscriber Concealed Identifier (SUCI).

4. The method of claim 2 wherein the multiple UDEs further comprise multiple Unified Data Repositories (UDRs), the NEF receiving the initial network data further comprises receiving a network instruction for the UE, and the NEF performing the network task for the UE with the SUPI comprises the NEF transferring another UDE query to the NRF, receiving the UDP indication from the NRF, and responsively transferring the SUPI and the network instruction for the UE to the UDP, and further comprising:
   the NRF receiving the other UDE query, and in response, selecting the UDP, and indicating the UDP to the NEF;
   the UDP receiving the SUPI and the network instruction for the UE, and in response, selecting one of the UDRs and transferring the SUPI and the network instruction for the UE to the selected one of the UDRs;
   the selected one of the UDRs receiving the SUPI and the network instruction for the UE and responsively, transferring the SUPI and the network instruction for the UE to a network element; and
   the network element receiving the SUPI and the network instruction for the UE and responsively performing another network task for the UE based on the SUPI and the network instruction for the UE.

5. The method of claim 4 wherein:
   the selected on of the UDMs is in a first Public Land Mobile Network (PLMN); and
   the selected one of the UDRs is in a second PLMN that is different from the first PLMN.

6. The method of claim 1 wherein
   the multiple UDEs comprise multiple Unified Data Repositories (UDRs);
   the NEF receiving the initial network data comprises receiving a UE Identifier (ID) and a network instruction for the UE;
   the NEF transferring the initial network data to the UDP comprises transferring the UE ID and the network instruction for the UE to the UDP;
   the UDP receiving the initial network data, selecting the one of the UDEs, and transferring the initial network data to the selected one of the UDEs comprises receiving the UE ID and the network instruction for the UE, selecting one of the UDRs, and transferring the UE ID and the network instruction for the UE to the selected one of the UDRs;
   the selected one of the UDRs receiving the UE ID and the network instruction for the UE and responsively transferring the UE ID and the network instruction for the UE to a network element; and the network element receiving the UE ID and the network instruction for the UE and responsively performing a network task for the UE responsive to the UE ID and the network instruction.

7. The method of claim 6 wherein the UE ID comprises a Subscriber Permanent Identifier (SUPI) for the UE.

8. The method of claim 6 further comprising:
an Application Function (AF) transferring the initial data that indicates the UE and the other network task to the NEF;
the network element generating and transferring a performance notice for the UE to the NEF responsive to performing the other network task for the UE;
the NEF receiving the performance notice for the UE and transferring the performance notice for the UE to the AF; and
the AF receiving the performance notice for the UE from the NEF.

9. The method of claim 6 wherein:
the network instruction comprises traffic influencing instruction for the UE; and
the network task comprises influencing traffic for the UE.

10. The method of claim 6 wherein the selected one of the UDRs transferring the UE ID to the network element comprises translating a Subscriber Permanent Identifier (SUPI) for the UE into an Internet Protocol (IP) address for the UE and transferring the IP address for the UE to the network element.

11. A method of operating a wireless communication network to serve a User Equipment (UE) with a Network Exposure Function (NEF) and multiple Unified Data Elements (UDEs), the wireless communication network comprising:
the NEF configured to receive initial network data and responsively transfer a UDE query to a Network Repository Function (NRF);
the NRF configured to receive the UDE query, and in response, select a Unified Data Proxy (UDP) and indicating the UDP to the NEF;
the NEF configured to receive the UDP indication and responsively transfer the initial network data to the UDP;
the UDP configured to receive the initial network data, and in response, select one of the UDEs and transfer the initial network data to the selected one of the UDEs; and
the selected one of the UDEs configured to receive the initial network data, and in response, generate and transfer new network data.

12. The wireless communication network of claim 11 wherein
the multiple UDEs comprise multiple Unified Data Managements (UDMs);
the NEF is configured to receive a UE Identifier (UE ID) for the UE and transfer the UE ID for the UE to the UDP;
the UDP is configured to receive the UE ID, select one of the UDMs, and transfer the UE ID to the selected one of the UDMs;
the selected one of the UDEs is configured to receive the UE ID for the UE, determine a Subscriber Permanent Identifier (SUPI) for the UE, and transfer the SUPI for the UE to the UDP; and further comprising
the UDP configured to receive the SUPI for the UE and transfer the SUPI for the UE to the NEF; and
the NEF configured to receive the SUPI for the UE and perform a network task for the UE with the SUPI.

13. The wireless communication network of claim 12 wherein the UE ID comprises at least one of a Generic Public Subscriber Identifier, Group Identifier, Network Access Identifier (NAI), Internet Protocol (IP) address, and Subscriber Concealed Identifier (SUCI).

14. The wireless communication network of claim 12 wherein the multiple UDEs further comprise multiple Unified Data Repositories (UDRs), the NEF is configured to receive a network instruction for the UE, transfer another UDE query to the NRF, receive the UDP indication from the NRF, and responsively transfer the SUPI and the network instruction for the UE to the UDP, and further comprising:
the NRF configured to receive the other UDE query, and in response, select the UDP, and indicate the UDP to the NEF;
the UDP configured to receive the SUPI and the network instruction for the UE, and in response, select one of the UDRs and transfer the SUPI and the network instruction for the UE to the selected one of the UDRs;
the selected one of the UDRs configured to receive the SUPI and the network instruction for the UE and responsively transfer the SUPI and the network instruction for the UE to a network element; and
the network element configured to receive the SUPI and the network instruction for the UE and responsively perform another network task for the UE based on the SUPI and the network instruction for the UE.

15. The wireless communication network of claim 14 wherein:
the selected on of the UDMs is in a first Public Land Mobile Network (PLMN); and
the selected one of the UDRs is in a second PLMN that is different from the first PLMN.

16. The wireless communication network of claim 11 wherein
the multiple UDEs comprise multiple Unified Data Repositories (UDRs);
the NEF is configured to receive a UE Identifier (ID) and a network instruction for the UE;
the NEF is configured to transfer the UE ID and the network instruction for the UE to the UDP;
the UDP is configured to receive the UE ID and the network instruction for the UE, select one of the UDRs, and transfer the UE ID and the network instruction for the UE to the selected one of the UDRs;
the selected one of the UDRs configured to receive the UE ID and the network instruction for the UE and responsively transfer the UE ID and the network instruction for the UE to a network element; and
the network element configured to receive the UE ID and the network instruction for the UE and responsively perform a network task for the UE responsive to the UE ID and the network instruction.

17. The wireless communication network of claim 16 wherein the UE ID comprises a Subscriber Permanent Identifier (SUPI) for the UE.

18. The wireless communication network of claim 16 further comprising:
an Application Function (AF) configured to transfer the initial data that indicates the UE and the other network task to the NEF;
the network element configured to generate and transfer a performance notice for the UE to the NEF responsive to performing the other network task for the UE;
the NEF configured to receive the performance notice for the UE and transfer the performance notice for the UE to the AF; and the AF configured to receive the performance notice for the UE from the NEF.

19. The wireless communication network of claim 16 wherein:

the network instruction comprises traffic influencing instruction for the UE; and the network task comprises influencing traffic for the UE.

20. The wireless communication network of claim 16 wherein the selected one of the UDRs is configured to translate a Subscriber Permanent Identifier (SUPI) for the UE into an Internet Protocol (IP) address for the UE and transfer the IP address for the UE to the network element.

\* \* \* \* \*